(12) United States Patent
Uehara

(10) Patent No.: US 8,617,358 B2
(45) Date of Patent: Dec. 31, 2013

(54) PURE LIQUID MANUFACTURING APPARATUS

(71) Applicant: Haruo Uehara, Saga (JP)

(72) Inventor: Haruo Uehara, Saga (JP)

(*) Notice: Subject to any disclaimer, the term of this patent is extended or adjusted under 35 U.S.C. 154(b) by 0 days.

(21) Appl. No.: 13/660,632

(22) Filed: Oct. 25, 2012

(65) Prior Publication Data

US 2013/0092522 A1 Apr. 18, 2013

Related U.S. Application Data

(63) Continuation of application No. PCT/JP2010/057707, filed on Apr. 30, 2010.

(51) Int. Cl.
*B01D 3/02* (2006.01)
*B01D 3/00* (2006.01)
*C02F 1/04* (2006.01)

(52) U.S. Cl.
USPC ............ 202/177; 202/185.1; 202/185.4; 202/233; 202/235

(58) Field of Classification Search
USPC .......... 202/176, 177, 185.1, 185.4, 232, 233, 202/235, 270; 203/3, 10, 11, 91, 94, 98
See application file for complete search history.

(56) References Cited

U.S. PATENT DOCUMENTS

| | | | | |
|---|---|---|---|---|
| 3,203,875 A | * | 8/1965 | Sturtevant | 202/173 |
| 3,245,883 A | * | 4/1966 | Loebel | 203/7 |
| 3,558,436 A | * | 1/1971 | Foley et al. | 202/196 |
| 3,844,899 A | * | 10/1974 | Sager, Jr. | 202/173 |
| 4,096,039 A | * | 6/1978 | Carnine et al. | 202/205 |
| 4,181,577 A | * | 1/1980 | Foley | 202/181 |
| 4,316,774 A | * | 2/1982 | Trusch | 203/11 |
| 4,985,122 A | * | 1/1991 | Spencer | 203/11 |
| 5,156,706 A | * | 10/1992 | Sephton | 159/47.1 |
| 5,164,049 A | * | 11/1992 | Clark et al. | 203/40 |
| 5,439,560 A | * | 8/1995 | Kurematsu et al. | 202/186 |
| 5,484,510 A | * | 1/1996 | Hartman et al. | 202/162 |
| 6,159,345 A | * | 12/2000 | Donnelly et al. | 203/1 |
| 6,375,803 B1 | * | 4/2002 | Razzaghi et al. | 203/1 |
| 6,436,242 B1 | * | 8/2002 | Sanchez Belmar | 202/182 |
| 6,506,284 B1 | * | 1/2003 | Miyasaka | 202/205 |

(Continued)

FOREIGN PATENT DOCUMENTS

| | | |
|---|---|---|
| JP | 55-054078 A | 4/1980 |
| JP | 61-259795 A | 11/1986 |

(Continued)

*Primary Examiner* — Nina Bhat
*Assistant Examiner* — Jonathan Miller
(74) *Attorney, Agent, or Firm* — Mirick, O'Connell, DeMallie & Lougee, LLP

(57) ABSTRACT

Provided is a pure liquid manufacturing apparatus capable of manufacturing pure liquid such as pure water efficiently. Together with a series of units, from a heating unit to a condensation unit, for obtaining pure liquid from vapor, a drain tank unit for storing liquid is disposed, after the liquid discharged from the vaporization unit and the separation unit and new liquid are mixed in advance in the drain tank unit, the mixed liquid is pressurized by a pump unit and supplied to the heating unit. Consequently, the drain tank unit serves as a buffer for pressure, thus making it possible to maintain easily the pressure in the respective units such as the vaporization unit, etc., and reduce load of a vacuum exhaust unit to ensure a reduced pressure state, and dispose the required minimum valves for maintaining the pressure, thereby achieving the simplification of the apparatus structure.

3 Claims, 2 Drawing Sheets

(56) References Cited

U.S. PATENT DOCUMENTS

| | | | |
|---|---|---|---|
| 7,465,375 B2 * | 12/2008 | Demers et al. | 202/160 |
| 7,597,784 B2 * | 10/2009 | Bednarek et al. | 203/1 |
| 7,955,478 B2 * | 6/2011 | McClure | 203/10 |
| 2003/0132095 A1 * | 7/2003 | Kenet et al. | 202/182 |
| 2004/0168901 A1 * | 9/2004 | Payne | 202/186 |
| 2009/0101490 A1 * | 4/2009 | Thiers | 202/166 |
| 2009/0145737 A1 * | 6/2009 | Kamen et al. | 202/185.1 |
| 2011/0203915 A1 * | 8/2011 | McClure | 203/3 |

FOREIGN PATENT DOCUMENTS

| | | | | |
|---|---|---|---|---|
| JP | 06-063535 A | | 3/1994 | |
| JP | 2000-167535 A | | 6/2000 | |
| JP | 2000-325941 A | | 11/2000 | |
| JP | 2002-079237 A | | 3/2002 | |
| JP | 2010131069 A | * | 6/2010 | D06F 31/00 |

\* cited by examiner

PURE LIQUID MANUFACTURING APPARATUS

RELATED APPLICATIONS

This patent application is a continuation of International Application No. PCT/JP2010/057707, filed on Apr. 30, 2010, entitled, "Pure Liquid Production Device," the contents and teachings of which are hereby incorporated by reference in their entirety.

FIELD

The present invention relates to a pure liquid manufacturing apparatus, which permits for manufacturing and supplying usable, pure liquid such as pure water.

BACKGROUND

Pure water, which has been obtained by removing impurities from water, has a feature of causing no adverse effects by the impurities. Therefore, it has been widely used in cleaning various kinds of devices such as a semiconductor, or manufacturing chemical substance such as pharmaceutical preparations, etc., in addition to use of test or experiment. However, such pure water has characteristics and properties that allow a relatively high level of dissolution of other substances into the water, compared to ordinary or non-purified water. It has recently been used also for drinking or edible use by adding naturally-derived nutritional components or flavor components thereto.

Various kinds of methods such as a filtration method, an ion-exchange method, a method utilizing a reverse osmosis membrane, etc. are used for manufacture of pure water. However, a manufacturing method utilizing distillation has conventionally being used widely as an easy and effective method. A pure water manufacturing apparatus utilizing such a distillation process is disclosed for example in JP 06-63535 A, JP 2006-167535 A or JP 2002-79237 A.

SUMMARY

The conventional pure water manufacturing apparatus, which is disclosed in the patent documents as indicated above, has a problem in that to increase a yield amount of pure water, a more complicated and larger size of the manufacturing apparatus would be required. The development and/or introduction of the apparatus for use would, accordingly, be difficult. Further, when a water vaporization step is carried out in a space within the apparatus, a load of a vacuum exhaust unit such as a vacuum pump to ensure a reduced pressure state becomes larger along with complication and a large size of equipment, and there would be no choice but to use a large-scale vacuum exhaust unit having a higher capacity. In addition, there is required a number of valves to maintain an air-tight state in respective parts of the manufacturing apparatus, thus increasing costs of the apparatus, and leading to an increased cost for obtaining pure water by the apparatus as used, causing such problems.

An object of the present invention, which has been made to solve the above-described problems, is to provide a pure liquid manufacturing apparatus, which permits to manufacture effectively pure liquid such as pure water in a simple structure, thus reducing costs for supplying the pure water, or the like.

A pure liquid manufacturing apparatus according to the present invention comprises: a heating unit that heats supplied liquid by heat exchange with a predetermined high temperature heat source to prepare liquid and/or vapor having a predetermined temperature; a vaporization unit to which the liquid and/or vapor obtained by the heating unit is to be supplied and that vaporizes at least the liquid in a decompression space and supplies vapor; a separation unit that collects the liquid contained in the vapor supplied from the vaporization unit to remove the liquid; a condensation unit that causes the vapor via the separation unit to be subject to heat exchange with a predetermined cooling liquid to condense it to obtain pure liquid; a drain tank unit that collects a remaining liquid, which has not been vaporized by the vaporization unit, and the liquid, which has been removed by the separation unit, to temporarily store the liquid; and a pump unit that pressurizes the liquid in the drain tank unit to supply it to the heating unit, wherein: liquid is newly supplied from a predetermined liquid supply source to the drain tank unit, and a mixed liquid of the liquid as newly supplied and the liquid from the vaporization unit and the separation unit in a mixed state is supplied from the drain tank unit through the pump unit to the heating unit.

According to the present invention, there is provided the drain tank unit that stores the liquid, which has not been vapored in the vaporization unit, and the liquid, which has been collected by the separation unit, together with a set of respective units of from the heating unit to the condensation unit, to obtain pure liquid from vapor by vaporization, so that the liquids from the vaporization unit and the separation unit are previously mixed with the new liquid and the liquid obtained by such a mixing is compressed by the pump unit and supplied to the heating unit. Therefore, the drain tank unit serves as a buffer for pressure, thus making it possible to maintain easily the pressure in the respective units such as the vaporization unit, the separation unit, etc., and reduce load of the vacuum exhaust unit to ensure a reduced pressure state for vaporization of the liquid. In addition, the number of valves as provided, etc. to maintain the pressure can be reduced to the requisite minimum, thus making the structure of the apparatus easy and reducing costs. The new liquid is introduced into the drain tank unit and the liquid as mixed in this drain tank unit is supplied to the heating unit. This makes it possible to utilize the liquid, which has not been vapored by the vaporization unit, and the liquid, which has been collected by the separation unit, as a part of the liquid to be heated in the heating unit, so as to recover appropriately heat generated in the heating unit, resulting in no need to continuously give a large amount of heat to the heating unit, thus reducing energy consumption. In addition, it is possible to reduce an amount of the liquid as newly supplied from outside to the heating unit to reduce an amount of the liquid as consumed and to remarkably reduce costs for manufacture of the pure liquid.

The pure liquid manufacturing apparatus according to the present invention may comprise, where appropriate, an auxiliary condensation unit that to which the pure liquid discharged from the condensation unit and a remaining vapor, which has not been condensed, are to be supplied, and that causes them to be subject to heat exchange with a predetermined cooling liquid to condense a gaseous phase and supplies a pure liquid to a subsequent stage.

According to the present invention, the auxiliary condensation unit is provided on the subsequent stage of the condensation unit so that the condensation is carried out in two stages of the condensation unit and the auxiliary condensation unit, for the vacuum exhaust unit such as an external vacuum pump to reduce pressure in internal spaces of the respective units leading from the vaporization unit to the condensation unit, as well as in conduits. This makes it possible to condense surely the non-condensed vapor flowing toward the vacuum exhaust unit to reduce load of the vacuum exhaust unit and increase a yield amount of the pure liquid.

The pure liquid manufacturing apparatus according to the present invention may comprise, where appropriate, a liquid supply tank unit that is provided between the liquid supply source and the drain tank unit to temporarily store the liquid as newly supplied from the liquid supply source and supply it to a side of the drain tank unit; and wherein: the drain tank unit is provided with a sensor unit that measures an electric conductivity of the mixed liquid of the liquid as newly supplied and the liquid from the vaporization unit and the separation unit in the mixed state, and in case where the electric conductivity of the liquid in the mixed state in the drain tank unit exceeds a predetermined upper limit value, a part of the liquid in the mixed state is flowed out and into the liquid supply tank unit.

According to the present invention, the liquid supply tank unit is provided on the previous side of the supply passage for the new liquid in the drain tank unit, and the drain tank unit is provided with the sensor unit for measuring the electric conductivity so that, when the electric conductivity of the mixed liquid in the drain tank unit is excessively high, the part of the liquid in the mixed state is flowed out from the drain tank unit into the liquid supply tank. This makes it possible to detect a state in which the electric conductivity of the mixed liquid exceeds the upper limit value by the sensor unit of the drain tank unit, even in case where electrolyte composition of the liquid in the mixed state in the drain tank unit is condensed, along with the continuous operation of the apparatus, and electrolyte concentration is not fully reduced by only supplying the new liquid, so that, when a part of the liquid in the mixed state having a high concentration of the electrolyte composition is flowed from the drain tank unit, water containing lower electrolyte composition is supplied from the liquid supply tank to the drain tank unit to compensate an amount of flow. It is therefore possible to reduce the electrolyte concentration in the liquid in the mixed state in the drain tank unit to a trouble-free value, so as to exclude a risk of adverse effects on the heating unit into which the liquid in the mixed state is supplied, as well as the vaporization unit, etc. In addition, the liquid in the mixed state, a part of which flows from the drain tank unit, is supplied into the liquid supply tank and mixed with the new liquid to be diluted, with the result that there is no need to discharge uselessly the liquid outside, thus reducing costs associated with loss of the liquid and a formulation of the discharging passages.

DETAILED DESCRIPTION

First Embodiment of the Present Invention

Now, the first embodiment of the present invention will be described below with reference to FIG. 1. In this embodiment of the present invention, an example of the apparatus for manufacturing pure water as pure liquid will be described.

Figure 1:
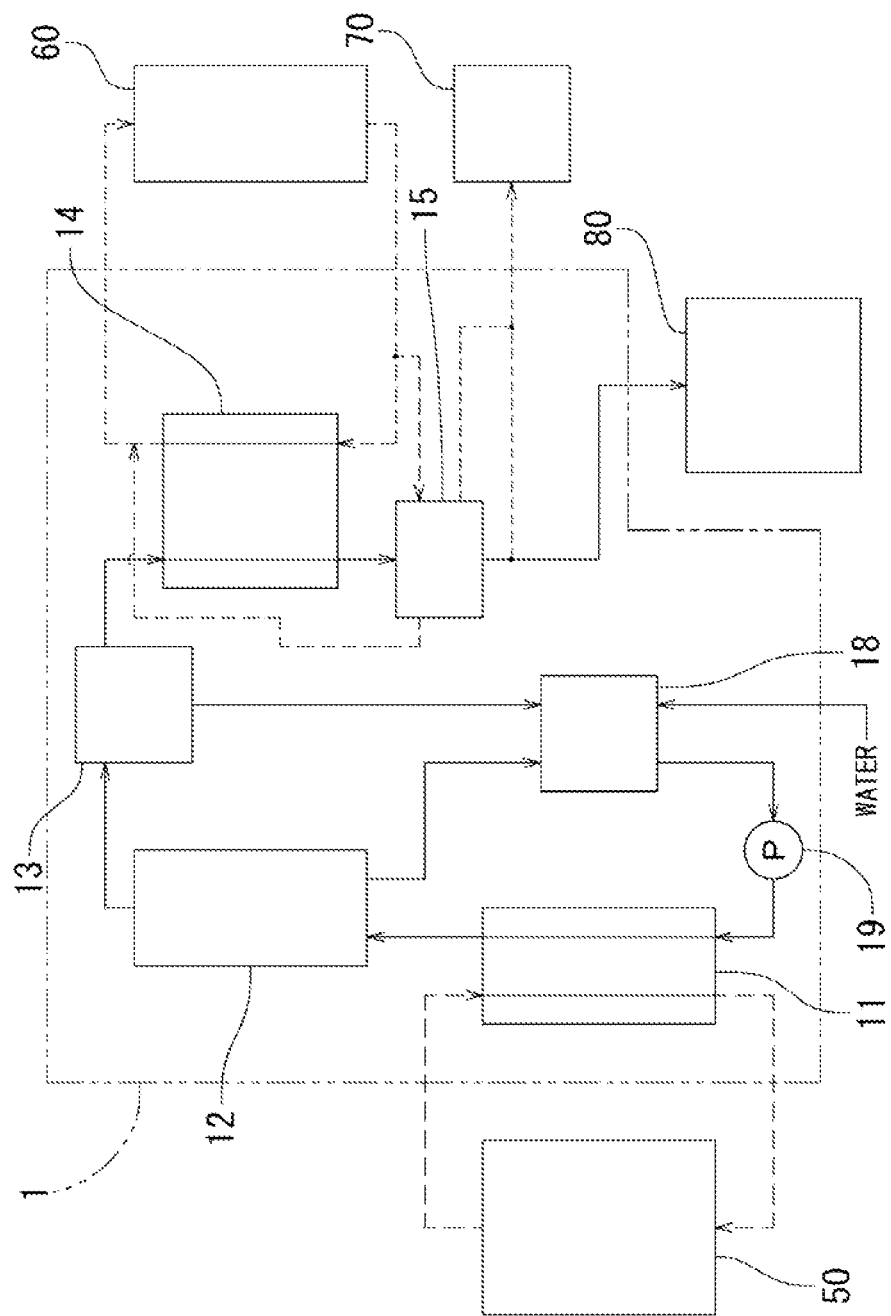
FIG. 1 is a block diagram of the pure liquid manufacturing apparatus according to the first embodiment of the present invention.

The pure water manufacturing apparatus 1 according to this embodiment of the present invention includes, as shown in FIG. 1, a heating unit 11 that heats water supplied as the above-mentioned liquid to prepare a warm water having a predetermined temperature, i.e., heated water; a vaporization unit 12 to which the heated water obtained by the heating unit 11 and that vaporizes the heated water in a decompression space; a separation unit 13 that removes water in liquid phase mixed with water in gas phase (water vapor) discharged from the vaporization unit 12; a condensation unit 14 that causes the water in gas phase via the separation unit 13 to be subject to heat exchange with cooling liquid to condense it to obtain pure water; an auxiliary condensation unit 15 that to which the pure water discharged from the condensation unit 14 and a remaining water in gas phase, which has not been condensed, are to be supplied, and that causes them to be subject to heat exchange with cooling liquid to condense a gaseous phase; a drain tank unit 18 that collects a remaining heated water, which has not been vaporized by the vaporization unit 12, and the water in liquid phase, which has been removed by the separation unit 13, to temporarily store the liquid; and a pump unit 19 that pressurizes the water in the drain tank unit 18 to supply it to the heating unit 11.

The above-mentioned heating unit 11 is a kind of heat exchanger in which the warm water or vapor as the above-described high temperature heat source obtained by a known boiler 50, etc., flows in one of passages, which are placed separately through internal heat transfer sections, and water to be heated, as supplied flows in the other passage, so as to heat the supplied water through heat exchange with the warm water or vapor through the heat transfer sections. The structure of the heat exchanger itself is known. The heating unit 11 heats the water as supplied and delivers it as the warm water, which has been heated to a predetermined temperature at which the warm water is capable of vaporing in the subsequent vaporization unit 12, to the vaporization unit 12.

The above-mentioned vaporization unit 12 is a known device that is capable of effectively vaporing the heated water by introducing it into an internal space under a pressure reduced to a pressure of a saturated vapor pressure of water or lower at the same temperature as the heated water, to obtain vapor. The vaporization unit 12 directly receives the water as heated to a predetermined temperature by the heating unit 11 at the previous stage and vaporizes the heated water to obtain water in gas phase (water vapor) substantially free of impurities. The vaporization unit 12 may have any kind of flash vaporization mechanism such as a multi-stage flash type or a spray flash type. The water vapor obtained by this vaporization unit 12 is supplied to the separation unit 13, and the remaining water in liquid phase without being vaporized is discharged out of the vaporization unit 12 and then introduced into the drain tank unit 18. The water in gas phase has a decreased temperature by drawing heat in phase change into the gas phase.

Keeping the temperature of the warm water to be introduced into the vaporization unit 12 as low as possible, for example, at a temperature of 50° C. or less, and reducing a pressure in the internal space to a pressure at which the warm water having such a low temperature may be vaporized make it possible to control the mixing ratio of impurities into the water vapor during vaporization of a part of the warm water so that the resultant water vapor becomes pure water with the level of an electric conductivity $\sigma=0.1\sim1$ [μS/cm].

The above-mentioned separation unit 13 collects fine droplets (mist) of water in liquid phase, which is mixed into the water vapor supplied from the vaporization unit 12 toward the condensation unit 14, to remove them, and delivers only the water vapor to the condensation unit 14. The water in the liquid phase, which has been collected by the separation unit 13, is discharged out of the separation unit 13 and introduced into the drain tank unit 18.

The above-mentioned condensation unit 14 causes the water vapor, which has been vaporized in the vaporization unit 12 and supplied via the separation unit 12, to flow in one of passages, which are placed separately through internal heat transfer sections, and causes a predetermined cooling liquid to flow in the other passage, so as to make heat exchange of the water vapor with the cooling liquid or water vapor through the heat transfer sections to condense the water vapor. The structure of the condensation unit itself is known. The condensation of the water vapor in this condensation unit 14 makes it possible to obtain pure water substantially free of impurities.

An external cooling unit 60 to cool the cooling liquid is connected to the passage for the cooling liquid of the condensation unit 14. The cooling liquid, which has an increased temperature due to heat exchange with the water vapor in the condensation unit 14, is introduced into the cooling unit 60. The cooling unit 60 cools this cooling liquid by heat exchange with the other cooling medium such as an external air, and then newly supplies the cooling liquid with a decreased temperature to the condensation unit 14.

The pure water in liquid phase obtained by condensation in the condensation unit 14 and the water vapor, which has not fully been vaporized by the condensation unit 14 are introduced into the above-mentioned auxiliary condensation unit 15. This unit makes heat exchange between the water vapor and the cooling liquid to condense the water vapor, and delivers all of them as introduced into it as the pure water in liquid phase to the subsequent stage.

The passage for the cooling liquid of the auxiliary condensation unit 15 is also connected to the cooling unit 60 in the same manner as the condensation unit 14 so that a part of the cooling liquid flows from the cooling unit 60 into the auxiliary condensation unit 15, the cooling liquid, which has an increased temperature due to heat exchange in the auxiliary condensation unit 15 is introduced into the cooling unit 60, together with the cooling liquid, which has flowed in the condensation unit 14, to cool, and the cooling liquid having a decreased temperature is newly introduced into the condensation unit 14 and the auxiliary condensation unit 15.

A vacuum exhaust unit 70 such as an external vacuum pump to reduce pressure in the internal spaces of the respective units leading to the vaporization unit 12, as well as in conduits, is connected to a water-side passage of the above-mentioned auxiliary condensation unit 15 and a pipe conduit on the subsequent stage of the auxiliary condensation unit. A system of utilizing the vacuum exhaust unit 70 to perform the condensation in two stages by the condensation unit 14 and the auxiliary condensation unit 15 enables the water vapor, which has flowed toward the vacuum exhaust unit 70 and has not as yet been condensed, to be condensed surely, to reduce load of the vacuum exhaust unit 70 and increase an yield amount of the pure water.

The pure water discharged from the auxiliary condensation unit 15 is delivered to an external pure water tank 80. The external pure water tank 80 has a function to supply continuously the pure water as stored therein in a predetermined amount to the subsequent stage.

The above-mentioned drain tank unit 18 collects the remaining warm water, which has not been vaporized in the vaporization unit 12 and the water in liquid phase as removed by the separation unit 13 together to temporarily store the same. The drain tank unit 18 acts not only as a role to store the warm water and the water in this manner, but also as a role to mix, in the apparatus, water newly supplied from a predetermined water supply source with the warm water from the vaporization unit 12 and the water in liquid phase from the separation unit 13 and to supply the mixed water as obtained to the heating unit 11.

In this drain tank unit 18, the remaining warm water, which has not been vaporized in the vaporization unit 12 and the water in liquid phase as removed by the separation unit 13 are mixed with the new water having a low temperature, as supplied from the water supply source to recover heat born by the water, which has once passed through the heating unit 11 and increase previously the temperature of the water as newly supplied to the heating unit 11, thus reducing an amount of heat as supplied in the heating unit 11.

The water, which has passed through the respective units of the manufacturing apparatus, does not reach the drain tank unit 18, immediately after the start of the apparatus, and the water as newly supplied is used as the whole of the water to be introduced into the heating unit 11. The new water is supplied through the drain tank unit 18. When a predetermined period of time has lapsed after the start of the apparatus, the water, which has passed through the respective units of the apparatus, reaches the drain tank unit 18, and an amount of the water as newly supplied to the drain tank unit 18 is decreased. Tap water or groundwater as continuously taken may be used as the new water.

Concerning placement of the respective units of the manufacturing apparatus, the vaporization unit 12, the separation unit 13 and the condensation unit 14 are disposed in the highest place, and the heating unit 11 and the drain tank unit 18 are disposed below the vaporization unit 12. The auxiliary condensation unit 15 is disposed below the condensation unit 14. This makes it possible to utilize a natural flow to cause the water to flow from the vaporization unit 12 and the separation unit 13 into the drain tank unit 18 and to cause the water to flow into the condensation unit 14 and the auxiliary condensation unit 15, without using a pump.

Now, an operation of the pure water manufacturing apparatus according to the present invention will be described below. There is the assumption that tap water is supplied as the water as newly supplied from the water supply source. Immediately after the start of the manufacturing apparatus of the present invention, only the tap water serving as the water as newly supplied from the water supply source is introduced into the drain tank unit 18. The new water is discharged from the drain tank unit 18 and is then compressed and supplied to the heating unit 11.

The water having a high temperature as a high temperature heat source from the boiler 50 is also supplied to the heating unit 11 so that the water as supplied is heated with heat of the high temperature water to obtain warm water. The warm water is discharged from the heating unit 11 and supplied to the vaporization unit 12.

When the warm water reaches the vaporization unit 12, a part of the warm water is converted into a gas phase with the flash vaporization in the vaporization unit 12 under the reduced pressure. The water in liquid phase, i.e., the water vapor is discharged from the vaporization unit 12, together with gasses contained in the water within the drain tank unit 18 and reaches the separation unit 13 so that the floating water in liquid phase (mist), etc., is appropriately separated by the separation unit 13 and then the water vapor is supplied into one of the passages of the condensation unit 14. The water, which has not been vaporized in the vaporization unit 12 and has remained as the liquid phase, and the water in liquid phase separated from the water vapor by the separation unit 13 are discharged from the respective unit and then delivered to the drain tank unit 18.

In the condensation unit 14, the water vapor is introduced into one of passages and the cooling water having a low temperature is introduced into the other passage, which is separated by the heat transfer sections, with the result that there is made heat exchange of the water vapor with the cooling liquid to condense the water vapor, thus preparing the pure water substantially free of impurities. The pure water and the water in liquid phase as not been condensed are discharged from the condensation unit 14 and reach the auxiliary condensation unit 15, and heat exchange with the cooling water having a low temperature is made again to perform further condensation of the water vapor. Gas, which has reached the auxiliary condensation unit 15 together with the pure water and the water vapor as not condensed, passes through the auxiliary condensation unit 15 and is sent from the pipe conduit of the subsequent unit to the vacuum exhaust unit 70, and then discharged outside.

The pure water as obtained through the condensation in the condensation unit 14 and the auxiliary condensation unit 15 is discharged from the auxiliary condensation unit 15 and then supplied to the external pure water tank 80. The cooling water, which has received heat from the pure water side as condensed by the condensation unit 14 and the auxiliary condensation unit 15 and had an increased temperature, is discharged from the condensation unit 14 and the auxiliary condensation unit 15 and supplied to an inlet side of the cooling unit 60.

In the drain tank unit 18, the new water as introduced is mixed with the waters, which have been discharged from the vaporization unit 12 and the separation unit 13 so that the temperature of the new water is increased during such a mixing step. The mixed water including the new water having the increased temperature through the mixing step is discharged from the drain tank unit 18 and then compressed by the pump unit 19 and introduced into the heating unit 11 so as to be heated to a higher temperature. The water discharged from the vaporization unit 12, the water discharged from the separation unit 13 and the new water from the water supply source join together to become the water to be supplied to the heating unit 11. It is therefore possible to reduce an amount of the new water to be supplied to the heating unit 11 by an amount of the water corresponding to the water, which has been discharged once and cycled. A supplying system in which the new water is previously mixed with the waters discharged from the vaporization unit 12 and the separation unit 13 and then the mixed water is compressed by the pump unit 19 and supplied to the heating unit 11, makes it possible to maintain easily the pressure of the respective units and reduce load of the vacuum exhaust unit 70. In addition, it is possible to discharge smoothly the water, which has not been vaporized in the vaporization unit 12 and the water, which has been collected by the separation unit 13, and introduce it again into the heating unit 11 in an effective manner.

Then, the respective steps to prepare the pure water are repeated in the same manner as described above, while supplying the water discharged from the drain tank unit 18 to the inlet side of the heating unit 11. A ratio of the waters discharged from the vaporization unit 12 and the separation unit 13 relative to the water supplied to the heating unit increases along with the continuous operation, and the temperature of the water to be supplied becomes higher. It is therefore possible to reduce an amount of the warm water serving as the high temperature heat source, which is required to increase the temperature of the water in the heating unit 11, and also reduce consumption of the fuel used for the external boiler and the like.

In the pure water manufacturing apparatus according to the embodiment of the present invention, there is provided the drain tank unit 18 that stores the liquid, which has not been vaporized in the vaporization unit 12, and the liquid, which has been collected by the separation unit 13, together with a set of respective units leading from the heating unit 11 to the condensation unit 15, to obtain the pure water from the water vapor by vaporization, so that the waters from the vaporization unit 12 and the separation unit 13 are previously mixed with the new water and the water obtained by such a mixing is compressed by the pump unit 19 and supplied to the heating unit 11. Therefore, the drain tank unit 18 serves as a buffer for pressure, thus making it possible to maintain easily the pressure in the respective units such as the vaporization unit 12, the separation unit 13, etc., and reduce load of the vacuum exhaust unit 70 to ensure a reduced pressure state for vaporization of the water. In addition, the number of valves as provided, etc. to maintain the pressure can be reduced to the requisite minimum, thus making the structure of the apparatus easy and reducing costs. The new liquid is introduced into the drain tank unit 18 and the water as mixed in this drain tank unit 18 is supplied to the heating unit 11. This makes it possible to utilize the water, which has not been vaporized by the vaporization unit 12, and the water, which has been collected by the separation unit 13, as a part of the water to be heated in the heating unit 11, so as to recover appropriately heat generated in the heating unit 11, resulting in no need to continuously give a large amount of heat to the heating unit 11, thus reducing energy consumption. In addition, it is possible to reduce an amount of the water as newly supplied from outside to the heating unit 11 to reduce an amount of the water as consumed and to remarkably reduce costs for manufacture of the pure water.

The pure water manufacturing apparatus according to the embodiment of the present invention has been described as using the high temperature water or vapor obtained in the boiler 50, etc., as the high temperature heat source to be introduced into the heating unit 11. In case where a low temperature, for example, 50° C. or less of the warm water obtained by the heating step in the heating unit suffices in accordance with the temperature condition of the warm water, which can be vaporized in the subsequent unit of the vaporization unit, an exhaust heat from a plant or surface seawater in a warm region may be utilized as the high temperature heat source as described above. In this case, at least a difference between the temperature of the high temperature heat source and the temperature of the cooling liquid in the condensation unit of 5° C. or less suffices in order to condense appropriately the water vapor, which has been vaporized in the vaporization unit. In case of utilizing the exhaust heat from a plant as the high temperature heat source, it is therefore possible to utilize the surface seawater, etc., as the cooling liquid, in addition to utilization of the cooling liquid as continuously cooled by the cooling unit as described above. In case of utilizing the surface seawater in a warm region as the high temperature heat source, deep seawater may be utilized as the cooling liquid.

Second Embodiment of the Present Invention

Now, the second embodiment of the present invention will be described below with reference to FIG. 2. In this embodiment of the present invention, an example of the apparatus for manufacturing pure water as pure liquid will be described in the same manner as the first embodiment as described above of the present invention.

Figure 2:
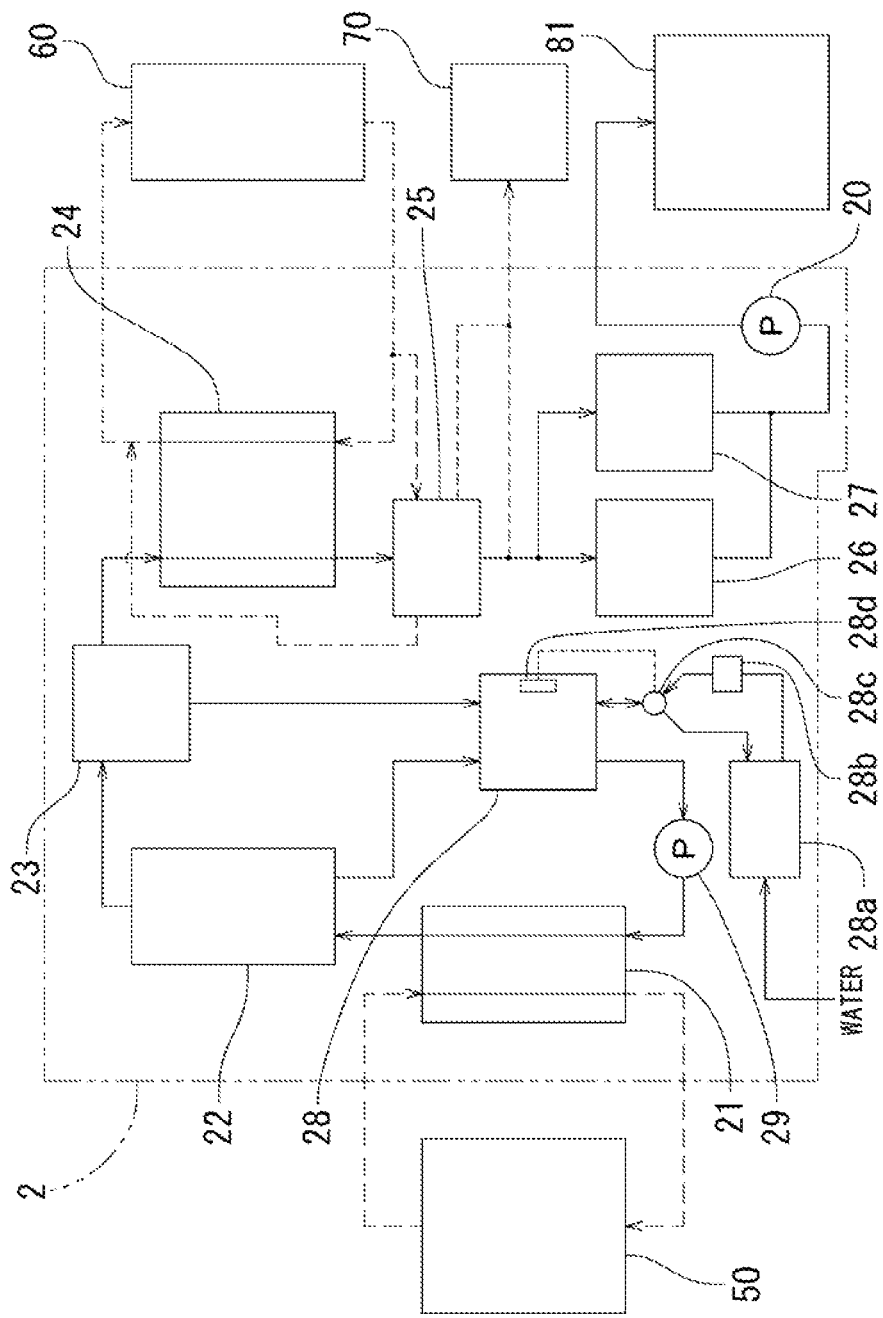
FIG. 2 is a block diagram of the pure liquid manufacturing apparatus according to the second embodiment of the present invention.

The pure water manufacturing apparatus 2 according to this embodiment of the present invention includes, as shown in FIG. 2, the heating unit 21, the vaporization unit 22, the separation unit 23, the condensation unit 24, the auxiliary condensation unit 25, the drain tank unit 28 and the pump unit 29 in the same manner as the first embodiment as described above of the present invention, but includes, as different structural components, two pure water tank units 26, 27 that temporarily store the pure water discharged from the auxiliary condensation unit 25, and a water supply tank unit 28a connected to the drain tank unit 28.

The pure water tank units 26, 27 as mentioned above are disposed on the subsequent side of the water-side passage of the auxiliary condensation unit 25 to store the pure water as condensed by the condensation unit 24 and the auxiliary condensation unit 25 in respective predetermined amounts and supply continuously the waters as stored to the subsequent unit side. The respective pure water tank units 26, 27 are disposed and connected in a dual system relative to the auxiliary condensation unit 25. The pure water tank units 26, 27 provided in such a dual system makes it possible to separate, while introducing the pure water as condensed into one of the pure water tank units and storing the water in it, the other pure water tank unit from the passage for the pure water to halt introduction of the pure water, so as to cause the pure water as already stored to flow into the subsequent side, thus perform simultaneously the storing of the pure water and the supplying of the pure water to the subsequent side, while maintaining the pressure of the flow passage. The pure water discharged from these pure water tank units 26, 27 is delivered to an external pure water tank unit 81 at a predetermined supply pressure by the pump unit 20 provided on the subsequent side.

The external pure water tank unit 81 is larger in capacity than the two pure water tank units 26, 27, so as to permit to supply continuously the pure water as stored in a predetermined amount to the subsequent side.

The water supply tank unit 28a as mentioned above is provided on the previous side of the supply passage for introducing the new water into the drain tank unit 28, so as to store temporarily the new water. In addition, in case where the electric conductivity of the mixed water in the drain tank unit 28 of the new water, the warm water from the vaporization unit 12 and the water in liquid phase from the separation unit 13 exceeds the limit value, the water supply tank unit causes this mixed water flowed out of the drain tank unit 28 to flow in it to mix the mixed water with the new water to dilute the mixed water so as to decrease the electric conductivity and then delivers the mixed water toward the drain tank unit 28 again.

There are provided in the water passage between this water supply tank unit 28a and the drain tank unit 28, a filter 28b that removes impurities contained in the new water, as well as a changeover valve 28c that permits the water to flow only from the side of the water supply tank unit 28a into the drain tank unit 28 in a normal state, and stops the mixed water from flowing from the side of the drain tank unit 28 into the water supply tank unit 28a, where appropriate, and permits simultaneously the mixed water to flow from the side of the drain tank unit 28 into the water supply tank unit 28a.

The water, which has passed through the respective units of the manufacturing apparatus, does not reach the drain tank unit 28, immediately after the start of the apparatus, with the result that the mixed water does not flow from the drain tank unit 28 into the water supply tank unit 28a, and accordingly the whole water in the water supply tank unit 28a is the new water. There may be used as the new water, freshwater such as tap water or groundwater as continuously taken, seawater, industrial wastewater, or the like.

The above-mentioned drain tank unit 28 collects the remaining warm water, which has not been vaporized in the vaporization unit 22 and the water in liquid phase as removed by the separation unit 23 together to temporarily store the same, and receives the new water as introduced from the water supply tank unit 28a, and mix, in the apparatus, the new water with the warm water from the vaporization unit 12 and the water in liquid phase from the separation unit 13 and to supply the mixed water as obtained to the heating unit 11, in the same manner as the first embodiment of the present invention as described above. In addition, the drain tank unit has a different function of operating, in case where the electric conductivity of the mixed water in the drain tank unit 28 is excessively high, the changeover valve 28c as described above to flow the mixed water toward the water supply tank unit 28a. The drain tank unit 28 is provided with a sensor unit 28d to measure the electric conductivity of the mixed water.

In this drain tank unit 28, the remaining warm water, which has not been vaporized in the vaporization unit 22 and the water in liquid phase as removed by the separation unit 23 are mixed with the new water having a low temperature, as supplied through the water supply tank unit 28a from the water supply source to recover heat born by the water, which has once passed through the heating unit 21 and increase previously the temperature of the water as newly supplied to the heating unit 21, thus reducing an amount of heat as supplied in the heating unit 21, in the same manner as the first embodiment of the present invention as described above.

Concerning placement of the respective units of the manufacturing apparatus 2 according to this embodiment of the present invention, the vaporization unit 22, the separation unit 23 and the condensation unit 24 are disposed in the highest place, and the heating unit 21 and the drain tank unit 28 are disposed below the vaporization unit 22. The auxiliary condensation unit 25 is disposed below the condensation unit 24 and the pure water tank units 26, 27 are disposed below the auxiliary condensation unit 25. This makes it possible to utilize a natural flow to cause the water to flow from the vaporization unit 22 and the separation unit 23 into the drain tank unit 28 and to cause the pure water discharged from the auxiliary condensation unit 25 to flow into the respective pure water tank units 26, 27, without using a pump.

Now, an operation of the pure water manufacturing apparatus according to the present invention will be described below. There is the assumption that tap water is supplied as the water as newly supplied from the water supply source in the same manner as the first embodiment of the present invention as described above. Immediately after the start of the manufacturing apparatus of the present invention, only the tap water serving as the water as newly supplied from the water supply source is introduced through the water supply tank unit 28a into the drain tank unit 28. The new water is discharged from the drain tank unit 28 and is then compressed by the pump unit 29 and supplied to the heating unit 21.

The water having a high temperature as a high temperature heat source from the boiler 50 is also supplied to the heating unit 21 so that the water as supplied is heated with heat of the high temperature water to obtain warm water. The warm water is discharged from the heating unit 21 and supplied to the vaporization unit 22.

When the warm water reaches the vaporization unit 22, a part of the warm water is converted into water vapor with the flash vaporization in the vaporization unit 22 under the reduced pressure. The water vapor is discharged from the vaporization unit 22, together with gasses contained in the water within the drain tank unit 28 and reaches the separation unit 23 so that the water in liquid phase (mist), etc., is appropriately separated by the separation unit 23 and then the water vapor is supplied into one of the passages of the condensation unit 24. The water, which has not been vaporized in the vaporization unit 22 and has remained as the liquid phase, and the water in liquid phase separated from the water vapor by the separation unit are discharged from the respective unit and then delivered to the drain tank unit 28.

In the condensation unit 24, the water vapor is subject to heat exchange with the cooling liquid to condense it, thus preparing the pure water substantially free of impurities. The pure water and the water in liquid phase as not been condensed are discharged from the condensation unit 24 and reach the auxiliary condensation unit 25, and heat exchange with the cooling water having a low temperature is made again to perform further condensation of the water vapor. Gas, which has reached the auxiliary condensation unit 25 together with the pure water and the water vapor as not condensed, passes through the auxiliary condensation unit 25 and is sent from the pipe conduit of the subsequent unit to the vacuum exhaust unit 70, and then discharged outside.

The pure water as obtained through the condensation in the condensation unit 24 and the auxiliary condensation unit 25 is discharged from the auxiliary condensation unit 25 and sent separately to the pure water tank units 26, 27 on the subsequent side to be stored in them, and then supplied, as a predetermined amount of the pure water as stored, to the external pure water tank 80 through the pump unit 20. The cooling water, which has received heat from the pure water side as condensed by the condensation unit 24 and the auxiliary condensation unit 25 and had an increased temperature, is discharged from the condensation unit 24 and the auxiliary condensation unit 25 and supplied to an inlet side of the cooling unit 60.

In the drain tank unit 28, the new water as introduced is mixed with the waters, which have been discharged from the vaporization unit 22 and the separation unit 23 so that the temperature of the new water is increased during such a mixing step. The mixed water including the new water having the increased temperature through the mixing step is discharged from the drain tank unit 28 and then compressed by the pump unit 29 and introduced into the heating unit 21 so as to be heated to a higher temperature. The water discharged from the vaporization unit 22, the water discharged from the separation unit 23 and the new water from the water supply source join together to become the water to be supplied to the heating unit 21. It is therefore possible to reduce an amount of the new water to be supplied to the heating unit 21 by an amount of the water corresponding to the water, which has been discharged once and cycled. A supplying system in which the new water is previously mixed with the waters discharged from the vaporization unit 22 and the separation unit 23 and then the mixed water is compressed by the pump unit 29 and supplied to the heating unit 21, makes it possible to maintain easily the pressure of the respective units and reduce load of the vacuum exhaust unit 70. In addition, it is possible to discharge smoothly the water, which has not been vaporized in the vaporization unit 22 and the water, which has been collected by the separation unit 23, and introduce it again into the heating unit 21 in an effective manner.

Then, the respective steps to prepare the pure water are repeated in the same manner as described above, while supplying the water discharged from the drain tank unit 28 to the inlet side of the heating unit 21. A ratio of the waters discharged from the vaporization unit 22 and the separation unit 23 relative to the water supplied to the heating unit increases along with the continuous operation, and the temperature of the water to be supplied becomes higher. It is therefore possible to reduce an amount of the warm water serving as the high temperature heat source, which is required to increase the temperature of the water in the heating unit 21, and also reduce consumption of the fuel used for the external boiler and the like.

A certain water quality of the new water may cause the electrolyte composition of the mixed water in the drain tank unit 28 to be condensed so remarkably along with the continuous operation of the apparatus, that even the supply of the new water may not reduce fully the electrolyte concentration, thus increasing a risk of causing adverse effects on the heating unit 21, the vaporization unit 22, etc. into which the mixed water is introduced. Accordingly, the electric conductivity of the mixed water is measured by the sensor unit 28d of the drain tank unit 28. When the electric conductivity of the mixed water increases at some level and the electric conductivity of the mixed water exceeds the upper limit value as previously set, the changeover valve 28c provided between the water supply tank unit 28a and the drain tank unit 28 is operated to cause the mixed water having a high concentration of the electrolyte composition to flow partially from the drain tank unit 28. After the flow of the mixed water, water having a low concentration of the electrolyte composition is supplied from the water supply tank unit 28a into the drain tank unit 28, this making it possible to reduce the concentration of the electrolyte composition of the mixed water in the drain tank unit 28 to a problem-free value. The part of the mixed water flowed from the drain tank unit 28 flows into the water supply tank unit 28a to be mixed with the new water to dilute, thus preventing the water from being discharged uselessly outside.

In the respective embodiments as described above, the pure liquid manufactured by the pure liquid manufacturing apparatus is the pure water and the tap water, the groundwater, the seawater, etc. is used as the new water to obtain the pure water. However, the present invention is not limited only to such an embodiment. The apparatus of the present invention may manufacture the liquid such as pure liquid such as hydrochloric acid, sulfuric acid, alcohol, acetone, hexane, serving as the pure liquid, from such a liquid containing impurities.

EXAMPLE

There have been examined a relationship between a temperature of the water to be introduced into the vaporization unit and an electric conductivity of the pure water as finally obtained, as well as a relationship between an electric conductivity of the water in the drain tank unit and the electric conductivity of the pure water as finally obtained, in case where the pure liquid manufacturing apparatus of the present invention was used as the pure water manufacturing apparatus. The respective examination results will be described below.

The pure water manufacturing apparatus according to the second embodiment of the present invention as described above was continuously operated at different temperatures, while changing the temperature of a warm water from the boiler for heating the water, which was to be introduced into the vaporization unit, and the electric conductivity of the pure water as finally obtained was measured. The measured values of the electric conductivity of the pure waters in the respective cases where the temperatures of the warm water from the boiler in the pure water manufacturing apparatus were set as 55° C., 60° C. and 65° C., respectively, are shown in Table 1.

TABLE 1

| Temperature of Warm Water from Boiler | Electric Conductivity [μS/cm] |
|---|---|
| 55° C. | 3.217 |
| 60° C. | 3.852 |
| 65° C. | 5.975 |

Table 1 reveals that the electric conductivity increases with increased temperature of the warm water from the boiler, thus leading to a reduced quality, and the electric conductivity of the pure water as finally obtained decreases with decreased temperature of the water to be introduced into the vaporization unit. An approximate curve was set up from the relationship between the temperature of the warm water from the above-mentioned boiler and the electric conductivity of the pure water to calculate values of the electric conductivity at the different temperatures. The relationship as shown in Table 2 was obtained. When the temperature of the warm water from the boiler fell below 50° C., the electric conductivity became 1.0 [μS/cm] or less.

TABLE 2

| Temperature of Warm Water from Boiler | Electric Conductivity [μS/cm] |
|---|---|
| 40° C. | 0.4 |
| 45° C. | 0.7 |
| 50° C. | 1.2 |
| 55° C. | 2.2 |
| 60° C. | 3.9 |
| 65° C. | 6.8 |
| 70° C. | 12.1 |
| 75° C. | 21.5 |
| 80° C. | 38.0 |

It was revealed that the pure water having the satisfactory value of electric conductivity as the pure water could be manufactured by decreasing the temperature of the water to be introduced into the vaporization unit as low as possible, especially to 50° C. or less.

Then, the pure water manufacturing apparatus according to the second embodiment of the present invention as described above was continuously operated, while keeping the temperature of the warm water from the boiler for heating the water, which was to be introduced into the vaporization unit, at a fixed temperature of 55° C., and the electric conductivity of the water in the drain tank unit and the electric conductivity of the pure water as finally obtained were measured at predetermined time intervals. The measured values of the electric conductivity of the water in the drain tank unit and the electric conductivity of the pure water as finally obtained, at the predetermined time intervals during the operation of the above-mentioned pure water manufacturing apparatus are shown in Table 3.

TABLE 3

| Lapse Time [minutes:seconds] | Electric Conductivity (Drain Tank Unit) [μS/cm] | Electric Conductivity (Pure Water) [μS/cm] |
|---|---|---|
| 0:00 | 140 | — |
| 0:30 | 253 | 0.85 |
| 6:30 | 1400 | 1.46 |
| 12:20 | 2300 | 2.90 |
| 14:10 | 2770 | 3.90 |

As is clear from Table 3, electric conductivity increases with time. It is recognized, as a cause of increasing the electric conductivity of the water in the drain tank unit with time, that there may be a state in which only the water is vaporized due to vaporization by the vaporization unit and is not cycled into the drain tank unit so that the electrolyte composition contained in the water in the drain tank unit is condensed. A study of a relationship between the electric conductivity of the water in the drain tank unit and the electric conductivity of the pure water as finally obtained, by a curve approximation, reveals that, when the value of the electric conductivity of the water in the drain tank unit increases, the value of the electric conductivity of the pure water as finally obtained increases in an exponential manner.

It is clear that the electric conductivity of the water in the drain tank unit is required to be kept smaller in order to keep the value of the electric conductivity of the pure water as finally obtained small, for example to 1.0 [μS/cm] or less, and effective is a system in which the electric conductivity is measured by the sensor unit of the drain tank unit as in the pure water manufacturing apparatus as described in the second embodiment of the present invention, and in case where the electric conductivity of the water in the drain tank unit exceeds the upper limit value, for example, about 500 [μS/cm], a part of the mixed water having a high concentration of electrolyte composition is flowed out from the drain tank unit and the water having a low content of electrolyte composition is supplied from the water supply tank unit to the drain tank unit to decrease the concentration of the electrolyte composition of the water in the drain tank unit.

REFERENCE SIGNS LIST 1, 2 pure water manufacturing apparatus
11, 21 heating unit
12, 22 vaporization unit
13, 23 separation unit
14, 24 condensation unit
15, 25 auxiliary condensation unit
18, 28 drain tank unit
19, 29 pump unit
20 pump unit
26, 27 pure water tank unit
28a water supply tank unit
28b filter
28c changeover valve
28d sensor unit
50 boiler
60 cooling unit
70 vacuum exhaust unit
80, 81 pure water tank unit

What is claimed is:
1. A pure liquid manufacturing apparatus, comprising:
a heating unit that heats a supplied liquid by heat exchange with a predetermined high temperature heat source to prepare a liquid and/or vapor having a predetermined temperature;
a vaporization unit operatively connected to the heating unit, the vaporization unit configured to receive the liquid and/or vapor from said heating unit and to vaporize at least said liquid in a decompression space;
a separation unit operatively connected to the vaporization unit, the separation unit configured to collect liquid of the liquid and/or vapor supplied from said vaporization unit to remove the liquid from the liquid and/or vapor;
a condensation unit operatively connected to the separation unit, the condensation unit configured to cause the vapor received from said separation unit to be subject to heat exchange with a predetermined cooling liquid to condense it to obtain pure liquid;

a drain tank unit operatively connected to the vaporization unit and to the separation unit, the drain tank configured to collect a remaining liquid, which has not been vaporized by said vaporization unit, and the liquid, which has been removed by said separation unit, to temporarily store the remaining liquid and the liquid which has been removed by said separation unit; and a pump unit operatively connected to the heating unit and to the drain tank, the pump unit configured to pressurize the liquid in said drain tank unit to supply it to said heating unit, wherein:

a fresh liquid is newly supplied from a predetermined liquid supply source to said drain tank unit such that the drain tank unit contains a mixed liquid, said fresh liquid as newly supplied, the remaining liquid from said vaporization unit, and the liquid which has been removed by said separation unit in a mixed state, the drain tank unit configured to supply the mixed liquid through the pump unit to said heating unit; and a liquid supply tank unit that is provided between said liquid supply source and the drain tank unit to temporarily store the fresh liquid as newly supplied from the liquid supply source and supply it to a side of the drain tank unit; and wherein:

said drain tank unit is provided with a sensor unit that measures an electric conductivity of the mixed liquid of said fresh liquid as newly supplied and the liquid from said vaporization unit and said separation unit in the mixed state, and the drain tank unit, when the electric conductivity of said liquid in the mixed state in said drain tank unit, as measured by the sensor, exceeds a predetermined upper limit value, is configured to flow out a part of the liquid in the mixed state into said liquid supply tank unit.

2. The pure liquid manufacturing apparatus, according to claim 1, further comprising:

an auxiliary condensation unit operatively connected to the condensation unit, the auxiliary condensation unit configured to discharge the pure liquid from said condensation unit and to receive a remaining vapor, which has not been condensed, and that causes the remaining vapor to be subject to heat exchange with a predetermined cooling liquid to condense a gaseous phase and supplies a pure liquid to a subsequent stage.

3. The pure liquid manufacturing apparatus, according to claim 1, wherein:

the drain tank unit comprises a changeover valve configured to, when the electric conductivity of said liquid in the mixed state in said drain tank unit exceeds a predetermined upper limit value, flow out a part of the liquid in the mixed state into said liquid supply tank unit; and the sensor unit is configured to measure the electric conductivity of the mixed liquid as exceeding a predetermined upper limit value.

* * * * *